April 24, 1956 F. W. SIDE 2,742,916
MEASURING AND CONTROLLING APPARATUS
Filed July 31, 1952

*INVENTOR.*
FREDERICK W. SIDE
BY
ATTORNEY.

United States Patent Office 2,742,916
Patented Apr. 24, 1956

2,742,916

MEASURING AND CONTROLLING APPARATUS

Frederick W. Side, Philadelphia, Pa., assignor to Minneapolis-Honeywell Regulator Company, Minneapolis, Minn., a corporation of Delaware Application July 31, 1952, Serial No. 302,008

11 Claims. (Cl. 137—85)

A general object of the present invention is to provide a new and improved apparatus for converting an electrical signal into a pneumatic pressure. More specifically, the present invention is concerned with a simple, compact, accurate device having an electrical signal on the input thereof and producing a pneumatic pressure which will vary proportionally with the magnitude of the electrical signal of the input.

In certain types of variable or condition control arrangements it has been found desirable to use electrical means for determining the magnitude of a measured variable or condition and utilizing the electrical signal for producing a hydraulic or pneumatic pressure which will be proportional to the electrical signal and which will be capable of operating upon means for changing the magnitude of the variable or the condition. Because of the fact that the electrical signal is converted to a pneumatic pressure it is essential that the conversion be made accurately and that the apparatus for making the conversion be simple, readily manufactured, and readily adjustable. In some instances it may also be desirable to produce non-linear pressure changes with linear electrical signals on the input so that convertibility of the basic unit must be easily accomplished.

It is therefore an object of the present invention to provide a new and improved apparatus for converting an electrical signal into a pneumatic pressure.

A further object of the present invention is to provide a converter which will convert an electrical signal into a pneumatic pressure which will be related to the electrical signal in a predetermined manner.

Another object of the present invention is to provide a new and improved converter for changing an electrical signal into a pneumatic pressure wherein the converting device utilizes an electromagnetic circuit for regulating the back pressure of a pneumatic nozzle assembly.

Still another object of the present invention is to provide an electric to pneumatic transducer which utilizes an electromagnetic circuit for regulating the back pressure of a nozzle assembly in a pneumatic system and wherein the nozzle back pressure is effective through adjustable means to vary the electromagnetic circuit.

The various features of novelty which characterize the invention are pointed out with particularity in the claims annexed to and forming a part of the specification. For a better understanding of the invention, however, its advantages and specific objects attained with its use, reference should be had to the accompanying drawings and descriptive matter in which there is illustrated and described a preferred embodiment of the invention.

Figure 1:
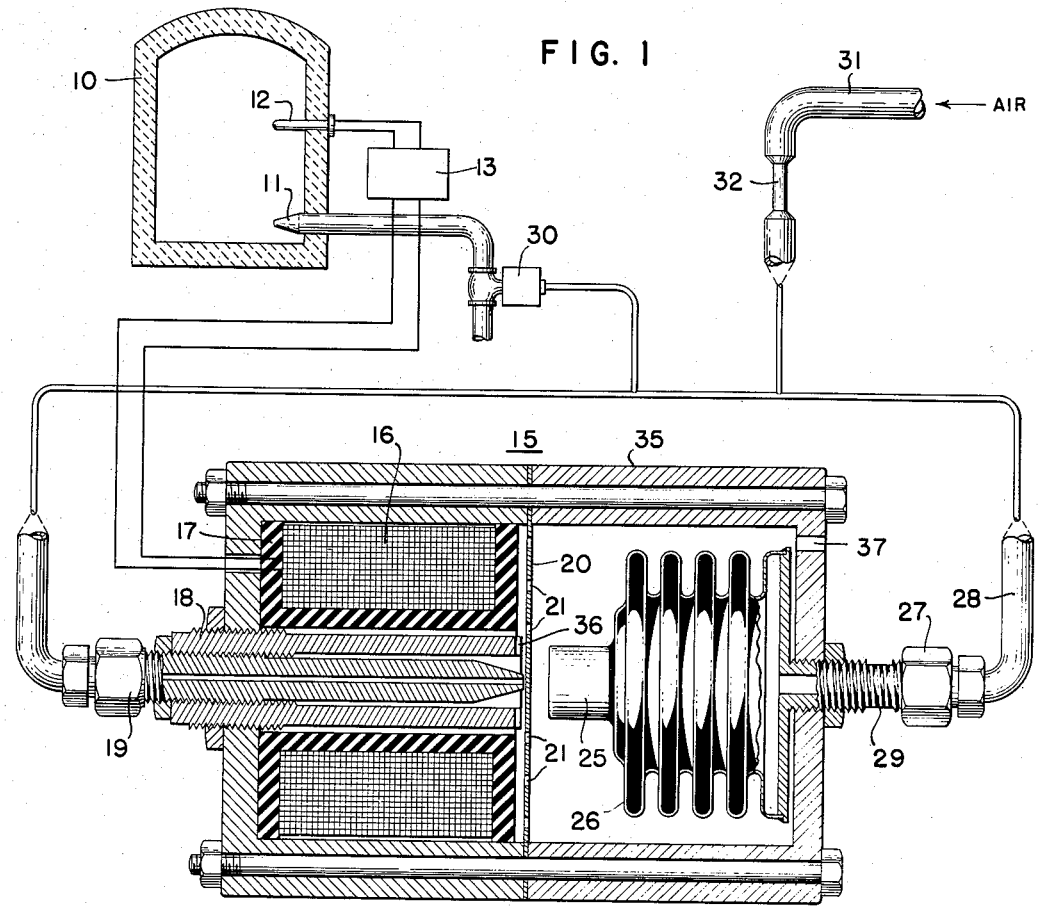
Figure 1 is a diagrammatic showing the the present invention as well as a showing of how the invention may be applied to a particular control problem.

Referring first to Figure 1, the numeral 10 represents a furnace whose internal temperature is to be controlled to a desired value. A burner nozzle 11 is provided to supply a combustible mixture to the furnace 10 so that the furnace may be heated. An electrical temperature sensitive element 12, which may be in the form of a thermocouple, is used to sense the temperature within the furnace 10. The output of the thermocouple is fed to a controller 13 which will convert the electrical signal of the thermocouple 12 to a signal of larger magnitude. Such an apparatus may take the form of that shown in the Machlet patent, Re. 21,345, issued February 6, 1940. The Machlet device is arranged to have an electrical output signal which is proportional to the magnitude of the input signal from a device such as a thermocouple.

The output from the device 13 which will be a direct current proportional to the thermocouple signal is fed to the electric to pneumatic converter or transducer 15. This transducer comprises an electromagnetic coil 16 which is wound upon a non-metallic bobbin 17. The bobbin 17 is hollow and has positioned therein an adjustable iron core 18 which is in the form of a hollow cylinder. The core 18 is axially adjustable within the bobbin 17 and is locked in position by a suitable lock nut. Positioned within the core 18 is a nozzle assembly 19, said assembly being adjustable within the core 18 and also locked in position by a suitable lock nut. Positioned adjacent the right end of the coil 16, the core 18, and the nozzle assembly 19 is a resilient member 20 which cooperates with the nozzle assembly 19 to vary the back pressure in the assembly.

Figure 2:
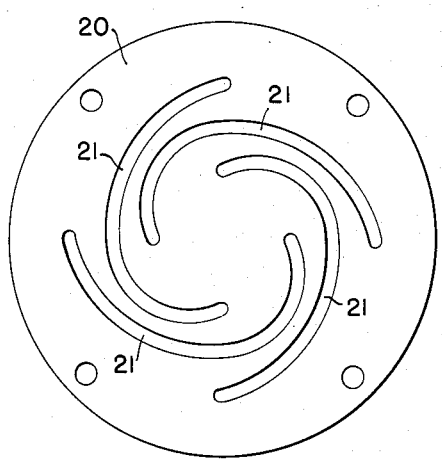
Figure 2 is a showing of one form that a portion of the apparatus of the present invention may assume.

The diaphragm or baffle 20 is shown in Figure 2 as a circular piece of metal having a plurality of arcuate slots 21 cut in the outer areas thereof to increase the resilient action of the diaphragm and to also provide an opening for passing air from the nozzle assembly 19.

Referring back to Figure 1 there is positioned on the opposite side of the diaphragm 20 a metallic member 25 which is mounted on the end of a pneumatic positioner in the form of a bellows 26. The bellows 26 is connected to be responsive to the back pressure of the nozzle assembly 19 by way of a coupling nut 27 and connection 28 which may be a hose or conduit. Adjustment of the bellows 26 may be made by turning the flattened threaded connection 29 with respect to the housing 35. This connection 29 may also be locked in position by a suitable lock nut. This same conduit also is connected to a suitable pneumatic valve 30 which is positioned to regulate the flow of combustible gases to the burner 11. Air is supplied under pressure to the pneumatic system from a suitable source of air supply, not shown, by way of a conduit 31 having a restriction 32 in the line.

The coil 16 and the elements positioned within the bobbin thereof, as well as the bellows 26, are all positioned within a metallic housing 35 which retains the elements in position and acts in part as a portion of the magnetic circuit of the transducer.

In considering the operation of the apparatus in Figure 1, let it first be assumed that the apparatus is in a state of balance so that the apparatus is undergoing no change. Under a state of balance, the temperature of the thermocouple will be at a fixed or desired value and the output of the device 13 will be a direct current which will be proportional to the magnitude of the temperature within the furnace 10. The direct current applied to the coil 16 will establish a magnetic field with one end of the coil assuming one polarity and the other end of the coil assuming an opposite polarity. The core 18, the housing 35, and the baffle or diaphragm 20 are selected to be of a material, such as soft iron, which will have extremely low magnetic retentivity. One material which may be used satisfactorily is identified by the trade name "Mu-Metal." The need for such metal is based on the desirability of having one particular magnetic condition of the core material for one particular direct current input signal. In other words, it is desired that there be no hysteresis error in the device.

With the coil 16 energized and a magnetic field set up through the core structure as set forth above, the action of this field will be to attract the baffle or diaphragm 20 toward the nozzle assembly 19 and therefore regulate the back pressure of the air flowing to the nozzle 19 from the air supply to the input conduit 31. The nozzle back pressure of the nozzle 19 will be reflected through the conduit 28 and the conduit connected thereto to the conduit 28 and the bellows 26 so that the belows will be extended by an amount proportional to the nozzle back pressure. As the bellows extends and moves the metallic plug 25 adjacent to the diaphragm 20, the attraction of the diaphragm 20 due to the coil 16 will be decreased and the diaphragm will move away from the nozzle a predetermined amount. The device will stabilize or balance at a particular pressure relative to the electrical current applied to the coil 16 and this pressure will be a function of the balance of the magnetic conditions existing in the vicinity of the diaphragm 20, said conditions including the action of the coil on the diaphragm and the counteracting effect of the plug 25 when moved adjacent to the diaphragm by the bellows 26. With a balance pressure condition in the device, the pressure in the nozzle system will be reflected to the pneumatic valve 30 which will assume a position proportional to the magnitude of the pressure to establish a predetermined flow of combustible materials to the nozzle 11. This will mean that the temperature within the furnace should remain effectively constant neglecting other changing effects upon the furnace 10.

In the event that the temperature change within the furnace 10 is such as to cause an increase in the current flow through the coil 16, the increase in energization of the coil 16 will cause the diaphragm or baffle 20 to be moved closer to the nozzle assembly 19 to thereby increase the back pressure in the pneumatic system. This increase in back pressure will be reflected around through the conduit 28 to the bellows 26 which will move the metallic plug 25 adjacent the diaphragm 20. Movement of the plug 25 closer to the diaphragm 20 will cause the diaphragm to move away from the nozzle 19 so that the back pressure will tend to decrease. However, the decrease will not be effective to cause the pressure to move back to the original value but it will stabilize out a new value which will be proportional to the change in the energization of the coil 16. Should the energization of the coil be decreased, the effect on the diaphragm 20 and the bellows 26 will be just the opposite and the apparatus will stabilize out at a lower back pressure with the bellows 26 moving the plug 25 away from the diaphragm 20.

Figure 3:
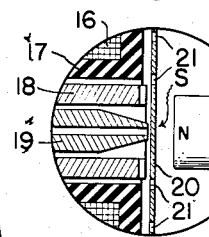
Figure 3 is an end view of a magnetic core and nozzle assembly of the present invention as shown in Figure 1.

Because of the close spacing of the core 18 and the diaphragm 20 it is essential that the air from the nozzle 19 be permitted to escape through the openings in the diaphragm 20 without causing any deflecting of the diaphragm as the air attempts to escape from the nozzle and from the core 18 which surrounds the nozzle. Referring to Figure 3 there is shown an end view of the core 18 and the nozzle assembly 19 as viewed from the end adjacent the diaphragm 20. This end view shows that the core 18 has a plurality of symmetrically spaced apertures or slots 36 on the end of the core and these slots will permit the air to escape from the nozzle 19 without adversely affecting the position of the diaphragm 20. The air escapes from the enclosure of housing 35 through the opening 37.

Adjustments of the apparatus may be affected by axially positioning the core 18 relative to the coil 17 as well as movement of the nozzle assembly 19 within the core 18. The bellows 26 is likewise made adjustable relative to the housing 35, as pointed out above, and the plug 25 may also be made adjustable relative to the bellows 26, by means not shown.

Figures 4, 5:
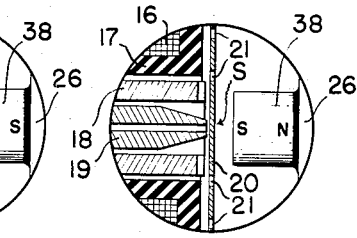
Figure 4 shows one manner in which the invention may be modified to produce a non-linear output.
Figure 5 shows a further modification indicating how the invention may be modified to produce an output which is the inverse of that produced in Figure 4.

Referring now to Figure 4, wherein the apparatus is modified, a section of the device 15 has been shown and this section is the nozzle assembly 19, the core 18, the coil 16, and the diaphragm 20. The plug 25, of Figure 1, has been replaced by a permanent magnet 38 which in this particular modification is shown with the north pole thereof adjacent to the diaphragm 20. In this particular modification it is desired that the pressure change in the nozzle 19 follow the change in electrical energization of the coil in a non-linear manner with the pressure changes being less than would normally occur with changes in energization of the coil 16 in the apparatus shown in Figure 1.

In considering the operation of this modified arrangement shown in Figure 4, first assume that the polarization of the core structure in the diaphragm is as indicated with the end of the core adjacent the diaphragm assuming a north pole and the center of the diaphragm assuming a south pole. It will thus be seen that the attraction of the diaphragm 20 as a south pole will be toward the north pole of the core 18. However, with the plug 38 being polarized so that the north pole is adjacent to the diaphragm 20 there will be an attraction of the diaphragm 20 toward the magnet 38. It will thus be seen that the movement of the magnet 38 toward the diaphragm 20 will have the affect of attracting the diaphragm 20 away from the core 18 and this attraction will be much greater than that present with the nonmagnetized plug as in Figure 1. With this arrangement it will be seen that with relatively large changes in the electrical signal applied to the coil 16 there will be produced a relatively small change in pneumatic pressure.

In the apparatus shown in Figure 5, the magnet 38 has been reversed so that now instead of the magnet 38 attracting the diaphragm 20, as in Figure 4, the magnet will repel the diaphragm 20. This repelling action will effectively reverse the tendency of the pressure to follow the electrical signal so that in this modification the pressure changes will be relatively large with relatively small changes in the electrical signal energizing the coil 16.

It can thus be seen that by simple modification, the apparatus can be made to produce an output pressure which is related to the input electrical signal with any desired relationship. It will be obvious that the arrangement shown in Figures 4 and 5 can be modified by changing the strength of the magnets used in the apparatus with respect to the diaphragm 20.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is:

1. A transducer for use with an electrical signal measuring apparatus and a pneumatic control device, the combination comprising, an electromagnet arranged for connection to a source of electrical signal potential, a resilient diaphragm positioned adjacent said electromagnet and arranged to be moved thereby in accordance with variations in the electrical signal potential, a nozzle arranged for connection to a source of pneumatic pressure having the opening thereof positioned in cooperative relation with respect to said diaphragm so that said nozzle will have a back pressure when connected to a source of pneumatic pressure which varies with the position of said diaphragm with respect to said nozzle, a pneumatic actuator arranged to move in accordance with changes in said nozzle back pressure and carrying an element having magnetic properties, means positioning said element adjacent said electromagnet and diaphragm to affect the electromagnetic field created by said electromagnet and thereby the operation of said electromagnet upon said diaphragm so that the output nozzle back pressure will be proportional to the magnitude of the electrical signal potential applied to said electromagnet.

2. An electric to pneumatic transducer comprising, an electromagnet, a resilient diaphragm arranged to be positioned by said electromagnet, a nozzle positioned so that said diaphragm will control the nozzle back pressure, pneumatic means responsive to said nozzle back pressure, said pneumatic means being arranged to position a member having magnetic properties adjacent said electromagnet in the vicinity of said diaphragm to vary the electromagnetic field created by said electromagnet and thereby the electromagnetic effect of said electromagnet on said diaphragm so that said nozzle back pressure will be proportional to the magnitude of the electrical signal applied to said electromagnet.

3. An electric to pneumatic transducer comprising, an electromagnet arranged for connection to a source of electrical potential, a resilient member arranged to be positioned adjacent one end of said electromagnet so as to be positioned in accordance with the magnetic effect of the electrical potential applied to said electromagnet, a nozzle arranged for connection to a source of pneumatic pressure, said nozzle being positioned adjacent to said resilient member so that the position of said member with respect to said nozzle will determine the back pressure of said nozzle, an element having magnetic properties positioned adjacent said resilient member in the area where said member is acted upon by the electromagnetic field of said electromagnet, and a pneumatic actuator arranged to move said element to vary the electromagnetic effect of said electromagnet on said resilient member in accordance with variations in said nozzle back pressure so that said nozzle back pressure will be a pressure which is proportional to the electrical signal potential applied to said electromagnet.

4. An electric to pneumatic transducer comprising, an electromagnet which is adapted to be connected to a variable source of electrical potential, a resilient member positioned adjacent one end of said electromagnet so as to be affected by the magnetic field from said electromagnet and positioned thereby, an adjustable core of magnetic material positioned within said electromagnet and having one end thereof adjacent said resilient member, a nozzle positioned in cooperative relation with respect to said resilient member and arranged so that when said nozzle is connected to a source of pneumatic pressure said nozzle will have a back pressure which will be dependent upon the position of said resilient member with respect to said nozzle, an element having magnetic properties positioned adjacent said core and said resilient member, and a pneumatic actuator arranged to position said element in accordance with variations in said nozzle back pressure so that element will affect the magnetic field of said electromagnet in its action to position the said resilient member so that the nozzle back pressure regulated by the movement of said member with respect to said nozzle will tend to vary directly with changes in the electrical potential applied to said electromagnet.

5. Apparatus for converting an electrical signal into a proportional pneumatic pressure, the combination comprising, an electromagnet arranged for connection to a source of electrical potential, a resilient diaphragm positioned adjacent one end of said electromagnet and arranged for movement thereby, an adjustable core within said electromagnet and having low magnetic retentivity, a pneumatic nozzle positioned to have the nozzle end thereof in cooperative relation with said diaphragm so that movement of said diaphragm will cause changes in the back pressure of said nozzle, said nozzle being adjustable with respect to said core and said diaphragm, a metallic element having low magnetic retentivity arranged for movement adjacent said resilient diaphragm to affect the action of said electromagnet upon said diaphragm, and a pressure controlled device arranged to vary the position of said element with respect to said diaphragm.

6. An electric to pneumatic transducer comprising, an electromagnet wound upon a hollow cylindrical core of non-magnetic material, a hollow cylindrical plug positioned within said core and adjustable with respect thereto, a pneumatic nozzle positioned within said hollow plug and adjustable with respect to said hollow plug, a resilient member positioned in cooperative relation with one end of said electromagnet and with said nozzle so that variation in the electric field produced by said electromagnet will move said resilient member and vary the back pressure in said nozzle, an adjustable metallic plug movable adjacent said resilient member to affect the magnetic action of said electromagnet upon said resilient member, and a pneumatic actuator for positioning said plug in accordance with a pressure related to a pressure in said nozzle.

7. In apparatus for converting an electrical signal into a pneumatic pressure, the combination comprising, an electromagnetic coil wound upon a hollow cylindrical bobbin of non-metallic material, said coil being arranged for connection to a suitable source of operating potential and when so connected having an electromagnetic field therein, a resilient member positioned adjacent one end of said coil and arranged to be moved in accordance with the energization of said coil when connected to said source, a hollow metallic cylindrical core positioned within said bobbin and adjustable with respect thereto and having one end adjacent said resilient member, a pneumatic nozzle assembly positioned within said cylindrical core and having a nozzle opening positioned in cooperative relation with respect to said resilient member so that variation in the position of said resilient member with respect to said opening will vary the back pressure in said pneumatic nozzle assembly, said nozzle assembly being formed of non-metallic material, field distorting means positioned adjacent said resilient member, and a pneumatic actuator for positioning said field distorting means relative to said resilient member in accordance with changes in pressure in said nozzle assembly.

8. In apparatus for converting an electrical signal into a pneumatic pressure, the combination comprising, an electromagnet comprising a coil of wire wound upon a hollow cylindrical bobbin member of non-magnetic material, a resilient member positioned adjacent one end of said coil and arranged to be moved in accordance with the electric energization of said coil when said coil is connected to a source of electrical potential, a hollow metallic cylindrical core adjustably positioned within said bobbin and having one end thereof adjacent said resilient member to concentrate electric field on said member, said core having a plurality of openings therein adjacent said resilient member, and an adjustable nozzle assembly having a nozzle aperture positioned in cooperative relation with respect to said resilient member and positioned within said cylindrical core with the other end of said assembly being arranged for connection to a source of pneumatic pressure and when so connected having a nozzle pressure which will vary in accordance with the position of said resilient member relative to said nozzle assembly.

9. In apparatus for producing from an electrical signal a pneumatic pressure which is proportional to the electrical signal, the combination comprising, a pneumatic nozzle assembly, a resilient metallic diaphragm positioned adjacent said nozzle assembly so as to regulate the back pressure of said nozzle assembly when said assembly is connected to a source of pressure, an electromagnet comprising a coil of wire wound upon a bobbin of non-magnetic material positioned adjacent said diaphragm, said coil when energized by a suitable source of power moving said diaphragm relative to said nozzle assembly, and pneumatically actuated means for varying the effect of said electromagnet on said diaphragm.

10. In apparatus for converting an electrical signal into a pneumatic pressure, the combination comprising, a pneumatic nozzle assembly having an opening at one end thereof and having the other end arranged for connection to a source of pneumatic pressure, a resilient diaphragm member of metallic material positioned adjacent to the opening of said assembly and adapted to vary the nozzle back pressure in accordance with the position of said diaphragm with respect to said nozzle assembly, a hollow metallic cylindrical core positioned around said nozzle assembly and having one end adjacent said diaphragm with said end having symmetrical apertures therein for the passage of the fluid from said nozzle assembly, an electromagnet positioned about said core and arranged to cooperate with said core in the movement of said diaphragm relative to said nozzle assembly, and a controller responsive to nozzle back pressure for affecting the positioning of said diaphragm by said electromagnet.

11. Apparatus for producing a pneumatic pressure which is related to an electrical signal, comprising, a pneumatic nozzle assembly having an opening therein, a resilient diaphragm positioned adjacent said opening, an electromagnet positioned so that said diaphragm will be positioned in accordance with the energization of said electromagnet to vary the back pressure of said nozzle assembly, and a metallic element having a predetermined magnetic orientation, said element being adjustable with respect to said diaphragm and said electromagnet so as to vary the effect of said electromagnet on said diaphragm.

References Cited in the file of this patent

UNITED STATES PATENTS

| | | |
|---|---|---|
| 854,300 | Moore | May 21, 1907 |
| 1,989,829 | Specht | Feb. 5, 1935 |
| 2,443,891 | Buerschaper | June 22, 1948 |
| 2,451,451 | Tate | Oct. 12, 1948 |
| 2,598,258 | Hoffman | May 27, 1952 |